US010562526B2

(12) United States Patent
Yako et al.

(10) Patent No.: US 10,562,526 B2
(45) Date of Patent: Feb. 18, 2020

(54) VEHICLE COMPONENT OPERATION

(71) Applicant: Ford Global Technologies, LLC, Dearborn, MI (US)

(72) Inventors: Sarra Awad Yako, Allen Park, MI (US); Theodore Borromeo, San Diego, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 142 days.

(21) Appl. No.: 15/837,541

(22) Filed: Dec. 11, 2017

(65) Prior Publication Data

US 2019/0176814 A1   Jun. 13, 2019

(51) Int. Cl.
*B60W 30/08* (2012.01)
*B60W 10/04* (2006.01)
*B60W 10/18* (2012.01)
*B60W 10/20* (2006.01)
*B60W 50/08* (2012.01)

(52) U.S. Cl.
CPC ........... *B60W 30/08* (2013.01); *B60W 10/04* (2013.01); *B60W 10/182* (2013.01); *B60W 10/20* (2013.01); *B60W 50/082* (2013.01); B60W 2030/082 (2013.01); B60W 2400/00 (2013.01); B60W 2540/10 (2013.01); B60W 2540/12 (2013.01); B60W 2540/18 (2013.01); B60W 2710/09 (2013.01); B60W 2710/188 (2013.01); B60W 2710/20 (2013.01)

(58) Field of Classification Search
CPC .... B60W 30/08; B60W 10/182; B60W 10/20; B60W 10/04; B60W 50/082; B60W 2030/082; B60W 2710/188; B60W 2710/20
See application file for complete search history.

(56) References Cited

U.S. PATENT DOCUMENTS

| | | | |
|---|---|---|---|
| 8,930,060 B1 * | 1/2015 | Lu | G05D 1/0214 340/438 |
| 9,098,080 B2 | 8/2015 | Norris et al. | |
| 9,494,940 B1 * | 11/2016 | Kentley | B60N 2/002 |
| 9,529,361 B2 | 12/2016 | You et al. | |
| 9,707,966 B2 | 7/2017 | Herbach et al. | |
| 2017/0066452 A1 | 3/2017 | Scofield | |
| 2017/0234689 A1 | 8/2017 | Gibson et al. | |
| 2018/0225769 A1 * | 8/2018 | Slusar | G08G 1/205 |

FOREIGN PATENT DOCUMENTS

| | | | |
|---|---|---|---|
| DE | 102011108870 A1 * | 4/2012 | |
| DE | 102014220303 A1 | 4/2016 | |

* cited by examiner

*Primary Examiner* — Michael J Zanelli
(74) *Attorney, Agent, or Firm* — Frank A. MacKenzie; Bejin Bieneman PLC

(57) ABSTRACT

A system includes a computer including a processor and a memory, the memory storing instructions executable by the computer to operate a component in a vehicle in an autonomous mode, detect an impact to the vehicle, and then actuate any of a propulsion, a brake, and a steering only according to user input.

17 Claims, 3 Drawing Sheets

VEHICLE COMPONENT OPERATION

BACKGROUND

Vehicles can operate in an autonomous mode along a roadway. In a vehicle impact, one or more vehicle components may be damaged. A computer in the vehicle can detect the vehicle impact, e.g., a front collision, a side collision, a rear collision, an oblique collision, etc., with one or more vehicle sensors. However, damage to specific vehicle components, including components necessary and/or desirable to vehicle operation and/or which could impede vehicle operation if used in a damaged state, can go undetected.

DETAILED DESCRIPTION

Figure 1:
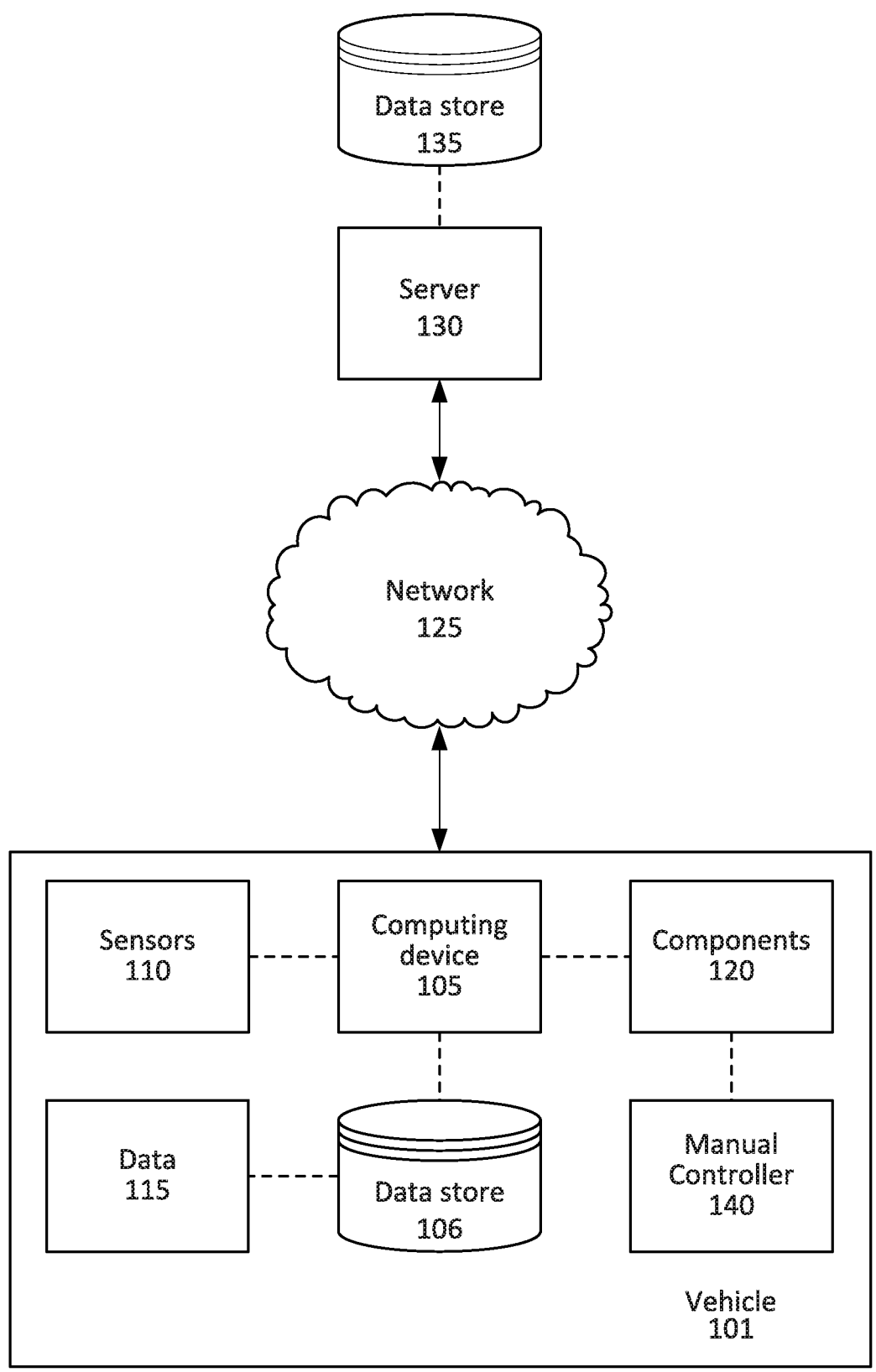
FIG. 1 is a block diagram of an example system for operating a vehicle.

A system includes a computer including a processor and a memory, the memory storing instructions executable by the computer to operate a component in a vehicle in an autonomous mode, detect an impact to the vehicle, and then actuate any of a propulsion, a brake, and a steering only according to user input.

The instructions can further include instructions to receive authentication data and to activate autonomous operation of the propulsion, the brake, and the steering upon receipt of the authentication data.

The instructions can further include instructions to, upon detecting the impact, actuate a parking brake and then actuate any of the propulsion, the brake, and the steering only according to user input.

The instructions can further include instructions to receive manual user input and actuate at least one of the propulsion, the brake, and the steering based on the manual user input.

The instructions can further include instructions to deactivate power to the component upon detecting the impact.

The instructions can further include instructions to suppress electrical signals from a virtual operator to the component.

The instructions can further include instructions to actuate the brake upon receiving input from a mechanical actuator.

A system includes a component in a vehicle, an interface connected to the component including means for manually actuating the component, means for autonomously operating the component, means for detecting an impact to the vehicle, and, upon detecting the impact, means for actuating any of a propulsion, a brake, and a steering only according to user input to the means for manually actuating the component.

The system can further include means for receiving authentication data and means for activating autonomous operation of the component upon receipt of the authentication data.

The system can further include means for actuating a parking brake upon detecting the impact.

The system can further include means for suppressing electrical signals from a virtual operator to the component.

The system can further include means for preventing autonomous actuation of a brake and means for manually actuating the brake.

A method includes operating a component in a vehicle in an autonomous mode, detecting an impact to the vehicle, and then actuating any of a propulsion, a brake, and a steering only according to user input.

The method can further include receiving authentication data and activating autonomous operation of the component upon receipt of the authentication data.

The method can further include detecting the impact, actuating a parking brake and then actuating any of a propulsion, a brake, and a steering only according to user input.

The method can further include suppressing electrical signals from a virtual operator to the component.

The method can further include actuating the brake upon receiving input from a mechanical actuator.

Upon detecting a vehicle impact, a computer in a vehicle can transition from an autonomous or semi-autonomous mode to a manual mode, allowing a human user to operate vehicle components, e.g., steering, brakes, propulsion, manually. The computer thus suppresses virtual operation of the vehicle components, preventing actuation by the computer of components that could have been damaged during the impact. Furthermore, the computer can continue to suppress autonomous or semi-autonomous operation in which it actuates such component(s) until receiving authorization from a human user, e.g., a service worker. The computer is thereby prevented from autonomously actuating the component(s) prior to repair. The human user can actuate a manual controller to manually actuate components (with or without assistance from the computer, e.g., power steering, brake assist, etc.) to move the vehicle after the impact but prior to repair.

FIG. 1 illustrates an example system 100 for operating a vehicle 101 after an impact. A computer 105 in the vehicle 101 is programmed to receive collected data 115 from one or more sensors 110. For example, vehicle 101 data 115 may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a communications bus. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 may be of any type, e.g., hard disk drives, solid state drives, servers, or any volatile or non-volatile media. The data store 106 may store the collected data 115 sent from the sensors 110.

Sensors 110 may include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a location of a target, projecting a path of a target, evaluating a location of a roadway lane, etc. The sensors 110 could also include short range radar, long range radar, LIDAR, and/or ultrasonic transducers.

Collected data 115 may include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 may include a plurality of vehicle components 120. As used herein, each vehicle component 120 includes one or more hardware components adapted to perform a mechanical function or operation—such as moving the vehicle, slowing or stopping the vehicle, steering the vehicle, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, and the like.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled only according to user input, i.e., by the human operator.

The system 100 may further include a network 125 connected to a server 130 and a data store 135. The computer 105 may further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The system 100 includes a manual controller 140. The manual controller 140 can be a device that physically actuates one or more vehicle components 120. The manual controller 140 can include an interface for user input, e.g., a joystick, a keyboard, buttons, a directional pad, i.e., including a cross-shaped button or set of buttons such as found on video game controllers that receives input in one of four directions. The interface can be connected, e.g., via a cable, a linkage, etc., to one or more components 120. For example, the interface can be a joystick connected with a flexible cable to a steering component 120. Upon receiving input from the joystick, the steering component 120 can move a steering rack (not shown) to turn a vehicle 101 wheel. The manual controller 140 can include sensors (not shown) that translate physical motion on or of the device to an electrical signal. The manual controller 140 can include a separate power supply (not shown) that allows actuation of the components 120 when the vehicle 101 is involved in an impact.

Figure 2:
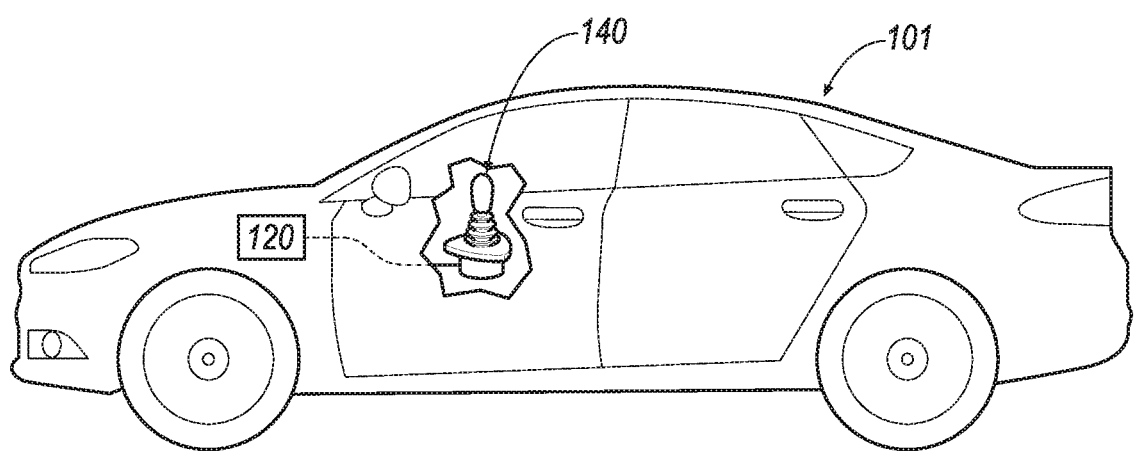
FIG. 2 illustrates an example vehicle with a manual controller.

FIG. 2 illustrates an example vehicle 101. The vehicle 101 can include the manual controller 140. The manual controller 140 can be connected to one or more vehicle components 120. The manual controller 140 can actuate the components 120 when the computer 105 operates the vehicle 101 in the manual mode, e.g., after a vehicle 101 impact. As used herein, an "impact" is a collision between the vehicle 101 and an object, e.g., another vehicle, a wall, a lamppost, a tree, etc. As described below, the computer 105 can detect the impact when acceleration data 115 from an acceleration sensor 110 exceeds an acceleration threshold determined from prior collision tests. As described above, the manual controller 140 can be connected to one or more vehicle components 120, and the computer 105 can be programmed to suppress actuation of the components 120 by input other than from the manual controller 140. Thus, when the vehicle 101 receives an impact, the computer 105 can prevent actuation of the components 120 by the computer 105 and only accept user input to the components 120 with the manual controller 140. The computer 105 can suppress autonomous operation by, e.g., deactivating power to the vehicle components 120 upon detecting the impact, suppressing electrical signals from the computer 105 to the vehicle components 120, etc.

The vehicle 101 can detect an impact to the vehicle 101. The vehicle 101 can include sensors 110 that can detect the impact. For example, the vehicle 101 can include accelerometers 110 that can measure an acceleration of the vehicle 101. The computer 105 can compare acceleration data 115 to stored acceleration threshold (e.g., 4 times the acceleration of gravity, 4G), determined based on vehicle 101 impact tests, and when the acceleration data 115 exceeds the acceleration threshold, the computer 105 can determine that an impact to the vehicle 101 has occurred. Upon detecting the impact, the computer 105 can suppress autonomous operation of the components 120, allowing only manual operation of the components 120.

One or more components 120 could be damaged during the impact. The computer 105 can attempt to actuate one of the possibly damaged components 120 after the impact. Actuating a damaged component 120 could further damage the component 120 and/or could be unsafe for the vehicle 101 user. Thus, the computer 105 can transition to a manual mode, allowing actuation of the components 120 by user input and preventing actuation of the component by the computer 105.

Prior to the impact, the computer 105 can actuate the components 120 in an autonomous mode. The computer 105 can receive a predetermined route from the server 130, and can actuate the components 120 in the autonomous mode to follow the route. Alternatively, when the vehicle 101 is in the semi-autonomous mode, the computer 105 can actuate one or more of the components 120 and the vehicle 101 user can actuate one or more of the components 120 to follow the route. When in the autonomous or the semi-autonomous mode, at least one of the components 120 is operated based on input from the computer 105.

Upon detecting the impact, the computer 105 can suppress the autonomous mode and actuate of the components 120 in a manual mode, i.e., only according to user input. One or more components 120 could be damaged, and the computer 105 can execute programming to ensure that damaged components 120 are not autonomously actuated. For example, the computer 105 can suppress autonomous operation of a brake 120 upon detecting the impact. Upon receiving user input from a manual actuator, e.g., the manual controller 140, a mechanical lever connected to the brake 120 and to the computer 105, etc., the user can actuate the brake 120 based on the user input. Alternatively, the manual actuator can instruct the computer 105 to actuate the brake 120, e.g., with a brake assist. There are similar possible arrangements with other components 120, e.g., steering (with a steering assist such as power steering), propulsion (with a propulsion assist such as variable valve timing), etc.

Prior to suppressing the autonomous mode but after detecting the impact, the computer 105 can actuate a parking brake 120 to stop the vehicle 101. The parking brake 120 prevents the vehicle 101 from moving until the parking brake 120 is released, e.g., with manual input from the vehicle 101 user to the manual controller 140. The computer 105 can actuate the parking brake 120 to prevent movement of the impacted vehicle 101 and actuation of possibly damaged components 120. For example, if the vehicle 101 impact occurs on an inclined hill, the parking brake 120 can stop the vehicle 101 from rolling down the hill.

The computer 105 can receive authorization to allow autonomous operation of the components 120. The computer 105 can be programmed to actuate the propulsion 120, the brake 120, and the steering 120 only according to user input until receiving authorization to allow autonomous operation. The authorization can be authentication data 115 that matches a stored authentication code (e.g., from a hash function, a public/private key encryption, etc.). The authentication data 115 can be sent from a human user, e.g., a service worker at a repair facility. Upon repairing the vehicle 101 after the impact, the service worker can provide the authentication data 115 to allow autonomous operation of the vehicle 101. Alternatively, the server 130 can provide the authentication data 115. Upon receiving the authentication data 115, the computer 105 can operate the components 120 in the autonomous or semi-autonomous modes.

Figure 3:
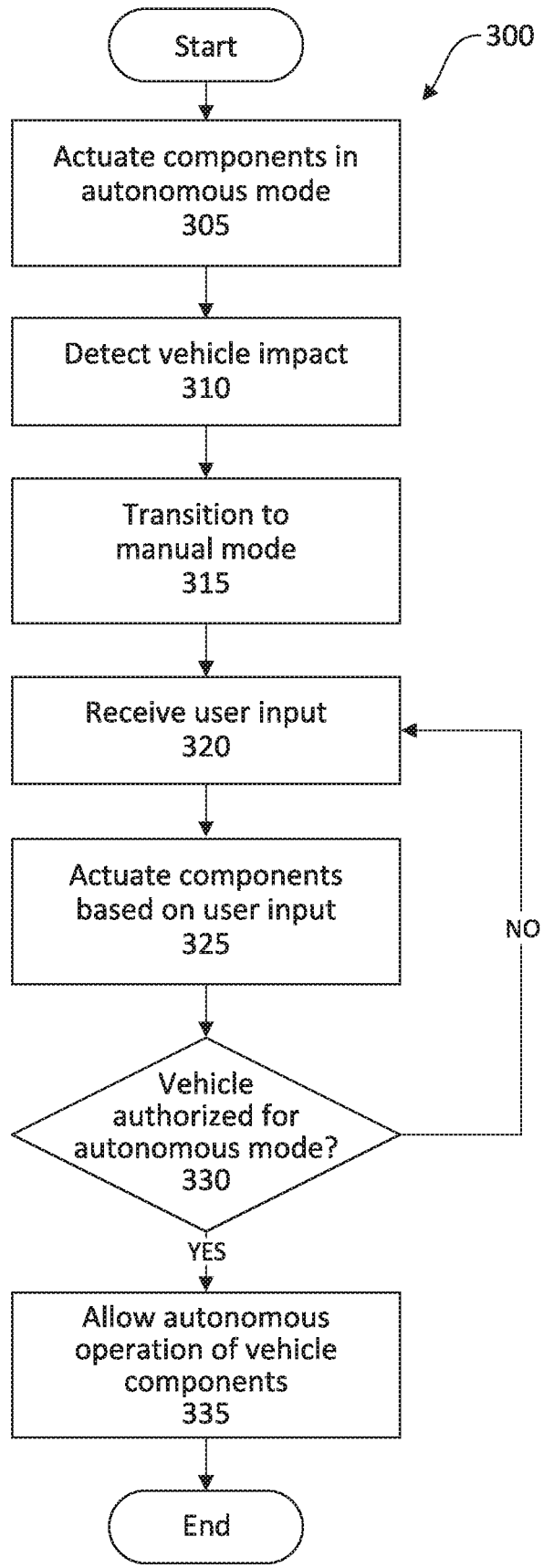
FIG. 3 is a block diagram of an example process for operating the vehicle.

FIG. 3 illustrates an example process 300 for operating a vehicle 101 after an impact. The process 300 begins in a block 305, in which the computer 105 actuates components 120 in an autonomous or a semi-autonomous mode. As described above, the computer 105 can actuate the components 120 to move the vehicle 101 without input from a vehicle 101 user along a predetermined route from the server 130. For example, the computer 105 can actuate a propulsion 120 to accelerate the vehicle 101 along a roadway.

Next, in a block 310, the computer 105 detects an impact to the vehicle 101. As described above, the computer 105 can include one or more sensors 110, e.g., an accelerometer, that can collect data 115. When the data 115 exceeds a predetermined threshold (e.g., an acceleration threshold), the computer 105 can determine that the impact has occurred. For example, the acceleration threshold can be 4 times the acceleration of gravity (i.e., 4G) based on impact tests, and when the acceleration data 115 from the accelerometer 110 indicates an acceleration greater than 4G, the computer 105 can determine that an impact has occurred.

Next, in a block 315, the computer 105 transitions to a manual mode and executes programming to actuate the propulsion 120, the brake 120, and the steering 120 only according to user input. Upon receiving the impact, the computer 105 can prevent autonomous operation of the components 120, allowing a vehicle 101 user to manually operate the components 120 to move the vehicle 101, e.g., to a shoulder of a roadway. One or more of the components 120 could have been damaged in the impact, and the computer 105 transitions to the manual mode to prevent autonomous operation of possibly damaged components 120.

Next, in a block 320, the computer 105 receives user input to one of the components 120. The user input can be, e.g., from a manual controller 140. Alternatively, the user can provide input to the component 120 directly, e.g., by depressing a brake pedal, depressing an acceleration pedal, rotating a steering wheel, etc. The user can provide user input to manually operate the component 120, e.g., to move the vehicle 101 to a roadway shoulder.

Next, in a block 325, the computer 105 actuates one or more components 120 based on user input. When the vehicle 101 is in the manual mode, the computer 105 can actuate the components 120 based on the user input. For example, based on input to the steering wheel, the computer 105 can actuate a steering component 120 to move a steering rack and rotate the wheels. Alternatively, if the component 120 can be actuated without input from the computer 105 (e.g., completely manually), the computer 105 can execute programming to prevent autonomous actuation the component 120 and allow the component 120 to be actuated manually.

Next, in a block 330, the computer 105 determines whether autonomous operation of the components 120 is authorized. As described above, the computer 105 can suppress autonomous operation of the components 120 until receiving authorization to allow autonomous operation. For example, a service worker at a repair facility can, upon repairing the vehicle 101, provide authentication data to the computer 105 to authorize autonomous operation of the components 120. If the computer 105 determines that autonomous operation has been authorized, the process 300 continues in a block 335. Otherwise, the process 300 returns to the block 320 to receive user input to the components 120.

In the block 335, the computer 105 allows the vehicle 101 to operate the components 120 in the autonomous mode. Having received authorization, the computer 105 actuates one or more components 120 in the autonomous or the semi-autonomous modes, as described above. The computer 105 can then continue to operate the vehicle 101 in the autonomous and semi-autonomous modes. Following the block 335, the process 300 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers 105 generally each include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 300, one or more of the steps could be omitted, or the steps could be executed in a different order than shown in FIG. 3. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the computer to:
   operate a component in a vehicle in an autonomous mode;
   detect an impact to the vehicle;
   suppress actuation of the component in the autonomous mode; and
   then actuate any of a propulsion, a brake, and a steering only according to user input.

2. The system of claim 1, wherein the instructions further include instructions to receive authentication data and to activate autonomous operation of the propulsion, the brake, and the steering upon receipt of the authentication data.

3. The system of claim 1, wherein the instructions further include instructions to, upon detecting the impact, actuate a parking brake and then actuate any of the propulsion, the brake, and the steering only according to user input.

4. The system of claim 1, wherein the instructions further include instructions to receive manual user input and actuate at least one of the propulsion, the brake, and the steering based on the manual user input.

5. The system of claim 1, wherein the instructions further include instructions to deactivate power to the component upon detecting the impact.

6. The system of claim 1, wherein the instructions further include instructions to suppress electrical signals from a virtual operator to the component.

7. The system of claim 1, wherein the instructions further include instructions to actuate the brake upon receiving input from a mechanical actuator.

8. A system, comprising:
   a component in a vehicle;
   an interface connected to the component including means for manually actuating the component;
   means for autonomously operating the component;
   means for detecting an impact to the vehicle;
   means for suppressing autonomous operation of the component upon detecting the impact; and
   upon detecting the impact, means for actuating any of a propulsion, a brake, and a steering only according to user input to the means for manually actuating the component.

9. The system of claim 8, further comprising means for receiving authentication data and means for activating autonomous operation of the component upon receipt of the authentication data.

10. The system of claim 8, further comprising means for actuating a parking brake upon detecting the impact.

11. The system of claim 8, further comprising means for suppressing electrical signals from a virtual operator to the component.

12. The system of claim 8, further comprising means for preventing autonomous actuation of a brake and means for manually actuating the brake.

13. A method, comprising:
   operating a component in a vehicle in an autonomous mode;
   detecting an impact to the vehicle;
   suppressing actuation of the component in the autonomous mode; and
   then actuating any of a propulsion, a brake, and a steering only according to user input.

14. The method of claim 13, further comprising receiving authentication data and activating autonomous operation of the component upon receipt of the authentication data.

15. The method of claim 13, further comprising detecting the impact, actuating a parking brake and then actuating any of a propulsion, a brake, and a steering only according to user input.

16. The method of claim 13, further comprising suppressing electrical signals from a virtual operator to the component.

17. The method of claim 13, further comprising actuating the brake upon receiving input from a mechanical actuator.

* * * * *